United States Patent
Lopez De Arroyabe

(10) Patent No.: US 11,411,269 B2
(45) Date of Patent: Aug. 9, 2022

(54) HIGH-VOLTAGE BATTERY FOR A MOTOR VEHICLE, AND MOTOR VEHICLE

(71) Applicant: Bayerische Motoren Werke Aktiengesellschaft, Munich (DE)

(72) Inventor: Jose Lopez De Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 131 days.

(21) Appl. No.: 16/963,958

(22) PCT Filed: Apr. 5, 2019

(86) PCT No.: PCT/EP2019/058594
§ 371 (c)(1),
(2) Date: Jul. 22, 2020

(87) PCT Pub. No.: WO2019/214882
PCT Pub. Date: Nov. 14, 2019

(65) Prior Publication Data
US 2021/0043991 A1    Feb. 11, 2021

(30) Foreign Application Priority Data
May 8, 2018 (DE) ............ 10 2018 207 154.3

(51) Int. Cl.
*H01M 10/658* (2014.01)
*H01M 10/615* (2014.01)
*H01M 50/24* (2021.01)

(52) U.S. Cl.
CPC ....... *H01M 10/658* (2015.04); *H01M 10/615* (2015.04); *H01M 50/24* (2021.01)

(58) Field of Classification Search
CPC ... H01M 10/658; H01M 10/614; H01M 50/24
See application file for complete search history.

(56) References Cited

U.S. PATENT DOCUMENTS

| | | | |
|---|---|---|---|
| 3,837,918 | A | 9/1974 | Nakabayashi |
| 6,340,538 | B1 | 1/2002 | King |

(Continued)

FOREIGN PATENT DOCUMENTS

| | | |
|---|---|---|
| DE | 101 07 657 A1 | 9/2001 |
| JP | 2013-69558 A | 4/2013 |
| WO | WO 2012/137053 A1 | 10/2012 |

OTHER PUBLICATIONS

International Search Report (PCT/ISA/210) issued in PCT Application No. PCT/EP2019/058594 dated Jul. 15, 2019 with English translation (five pages).

(Continued)

*Primary Examiner* — Jimmy Vo
(74) *Attorney, Agent, or Firm* — Crowell & Moring LLP

(57) ABSTRACT

A high-voltage battery for a motor vehicle includes at least one battery module including a cell block with stacked battery cells, wherein the battery cells are embodied as solid-body cells, the internal resistance of which decreases as the temperature rises, a battery housing having a receiving space for receiving the at least one battery module, and a heat-insulating holding device for holding the at least one battery module in the receiving space. The heat-insulating holding device is designed to minimize heat exchange between the at least one battery module and the battery housing for preventing cooling of the battery cells. A motor vehicle with the high-voltage battery is also provided.

9 Claims, 3 Drawing Sheets

(56) References Cited

U.S. PATENT DOCUMENTS

2015/0280190 A1* 10/2015 Ohshiba .............. H01M 50/209
                                                                 429/53
2018/0034121 A1    2/2018 Kwon et al.

OTHER PUBLICATIONS

German-language Written Opinion (PCT/ISA/237) issued in PCT Application No. PCT/EP2019/058594 dated Jul. 15, 2019 (five pages).

German-language Office Action issued in German Application No. 10 2018 207 154.3 dated Feb. 21, 2019 (four pages).

* cited by examiner

HIGH-VOLTAGE BATTERY FOR A MOTOR VEHICLE, AND MOTOR VEHICLE

BACKGROUND AND SUMMARY OF THE INVENTION

The invention relates to a high-voltage battery for a motor vehicle having at least one battery module that has a cell block consisting of stacked battery cells, and having a battery housing that has a reception space for receiving the at least one battery module. The invention also relates to a motor vehicle having a high-voltage battery.

What are of interest here are in particular high-voltage batteries or high-voltage accumulators that have a multiplicity of battery cells that are connected to form battery modules. These battery cells are usually arranged in a reception space of a battery housing. Such high-voltage batteries may for example be used as traction batteries for supplying energy to an electric drive machine of a motor vehicle designed as an electric vehicle or hybrid vehicle. In this context, it is known from the prior art to use lithium ion cells (li-ion cells) as the battery cells. Such lithium ion cells however require active cooling in order to keep a temperature of the cells below a certain threshold value, for example 60° C. This results in the disadvantage that a cooling device has to be used for active cooling, which cooling device requires installation space in the high-voltage battery, increases the weight of the high-voltage battery and entails high costs. Dispensing with cooling would reduce the efficiency of the battery cells.

The object of the present invention is to provide a high-voltage battery that is optimized in terms of installation space, optimized in terms of weight, inexpensive and efficient.

This object is achieved according to the invention by a high-voltage battery and a motor vehicle having the features according to the respective independent patent claims. Advantageous embodiments of the invention are the subject matter of the dependent patent claims, the description and the figures.

A high-voltage battery according to the invention for a motor vehicle comprises at least one battery module having a cell block consisting of stacked battery cells, wherein the battery cells are designed as solid-state cells whose internal resistance decreases as the temperature increases. The high-voltage battery also has a battery housing having a reception space for receiving the at least one battery module and a thermally insulating holding device for holding the battery module in the reception space. The thermally insulating holding device is designed to minimize an exchange of heat between the battery module and the battery housing in order to prevent cooling of the battery cells.

The high-voltage battery is in particular designed as a traction battery for an electrically driveable motor vehicle. The high-voltage battery may have a multiplicity of battery modules, wherein each battery module has a cell block consisting of interconnected battery cells. The battery modules are arranged in the reception space or inner space of the battery housing. The reception space of the battery housing is defined by the housing walls of the battery housing. The housing walls are in particular a housing base, a housing ceiling and a housing shell having two side walls, a front wall and a rear wall.

The battery cells or secondary cells are in particular pouch cells that are stacked to form the cuboidal cell block. The battery cells are in this case designed as solid-state battery cells or all-solid-state battery cells (ASS battery cells). Such solid-state cells, unlike conventional lithium ion cells, have a solid electrolyte. Liquid electrolytes are particularly flammable, meaning that a high-voltage battery having solid-state cells has a particularly safe design. The solid-state cells also have a decreasing internal resistance as temperatures increase, and thus a decreasing power loss. Such solid-state cells are thus more efficient than lithium ion cells at high temperatures, in particular up to around 100° C., the temperature of these lithium ion cells not being allowed to exceed a certain threshold value, in particular 60° C.

The high-voltage battery, which has cell blocks consisting of solid-state cells, may thus be designed without cooling. In other words, it is possible to dispense with a cooling device for actively cooling the solid-state cells during operation of the high-voltage battery. Instead, cooling of the battery cells of the high-voltage battery should be prevented if said battery cells heat themselves up and/or are actively heated during operation of the high-voltage battery, for example. To this end, use is made of the thermally insulating holding device, which holds the battery modules in the reception space of the battery housing and at the same time prevents heat from being transported out of the battery cells. The thermally insulating holding device thus permits a small amount of thermal coupling between the battery module and the battery housing. In other words, the thermally insulating holding device at least reduces an output of heat from the battery cells to the surroundings of the battery cells, for example to the battery housing. A virtually adiabatic structure is thus formed by the holding device with the battery modules attached thereto.

A high-voltage battery that is particularly installation space-saving, lower in weight and inexpensive is thus able to be achieved by virtue of dispensing with a cooling device. By virtue of preventing cooling of the solid-state cells, which operate efficiently at high temperatures, by way of the thermally insulating holding device, it is furthermore possible to provide an efficient and powerful high-voltage battery that is for example able to be charged and discharged quickly.

The thermally insulating holding device is particularly preferably designed to mount the at least one battery module in the reception space of the battery housing suspended at a distance from housing walls of the battery housing. The at least one battery module is in particular mounted such that it is arranged at a distance from the housing base, the housing shell and the housing ceiling. A distance between the battery module and a housing wall in the form of a housing base in the suspended state of the battery module is in particular at least 5 mm, in particular at least 10 mm. The battery module is thus mounted so as to hover above the housing base.

By virtue of the suspended arrangement of the battery module in the battery housing, the battery module has virtually no thermal coupling with the battery housing. The battery module is coupled to the battery housing only via the thermally insulating holding device. The majority of an outer surface of the battery module is thus surrounded by air in the reception space, which provides particularly good thermal insulation for the battery module. An output of heat from the battery module to its surroundings, that is to say to the air in the reception space and to the battery housing, is thereby minimized. By virtue of the distance between the battery module and the housing base, it is also possible to prevent an obstacle close to the base and whose height is greater than a ground clearance of the motor vehicle from damaging the battery module when the motor vehicle drives over the obstacle that damages the housing base. The arrangement of the battery module at a distance from the housing base furthermore allows unhindered expansion of the solid-state cells during operation of the high-voltage battery.

In one development of the invention, the thermally insulating holding device has at least one support apparatus arranged in the reception space and mechanically connected to the battery housing and at least one holding element connected to the at least one battery module. The at least one holding element is clamped on one side in the at least one support apparatus such that the cell block of the at least one battery module is mounted in the battery housing suspended at a distance from the housing walls of the battery housing and at a distance from the support element.

The at least one support apparatus of the holding device is arranged in the reception space of the battery housing. The support apparatus may be mechanically connected and fastened to at least one of the housing walls of the battery housing, for example to the housing base. The at least one holding element may in particular be clamped into the support apparatus in order to support the battery modules on the at least one support apparatus. The support apparatus thus in particular forms a support for the at least one holding element. The holding element is in particular an arm-shaped or cantilever arm-shaped element that is connected to the battery module at one end and is connected to the support apparatus at the other end by clamping. By virtue of the at least one holding element, the cell block is mounted at a distance from the at least one support apparatus. In this case, a width of the holding element is in particular significantly smaller than a width of the cell block. As a result of the at least one holding element and the at least one support apparatus, a contact area between the battery module and the holding device is thus particularly low, such that the transportation of heat via the holding device is able to be kept particularly small.

It proves to be advantageous if the holding device has two support apparatuses for holding the at least one battery module and at least two holding elements that are arranged on two opposing sides of the battery module, wherein the at least one battery module is supported on both sides by the holding elements clamped on the support apparatuses on one side and is mounted suspended between the support elements. A battery module may thus be supported on both sides by two support apparatuses. To this end, the battery modules on the opposing sides of the cell block each have at least one holding element that are connected mechanically to the support apparatuses. In this case, two battery modules may be supported by a total of three support apparatuses by using the support apparatus, arranged between the two battery modules, to clamp holding elements of both battery modules. The battery modules are held reliably and securely in the reception space by virtue of the support on both sides.

In one embodiment of the invention, the at least one support apparatus has a cross strut attached to a housing wall in the form of a housing base and a fastening strip, wherein the holding element is clamped between the cross strut and the fastening strip attached to the cross strut. The cross strut is a strip-shaped element whose bottom side is fastened to the housing base and whose top side may be connected, for example screwed, to the fastening strip. The at least one holding element may be braced or clamped between the top side of the cross strut and the fastening strip, such that the battery module is supported via the holding element of the support apparatus. The at least one holding element is preferably designed as an in particular U-shaped tab that protrudes laterally from the cell block and is clamped by the support apparatus. The holding element is in particular designed so as to protrude perpendicularly from a side, facing the support apparatus, of the cell block.

In one development of the invention, the at least one battery module has two press plates between which the cell block is arranged, and at least two tie rods that are routed along opposing sides of the cell block and that are connected to the press plates, forming a cell module frame that surrounds the cell block and presses the battery cells against one another. The at least one holding element is integrated into the cell module frame. The cell module frame serves to brace the battery cells in the cell block. To this end, the cell module frame has the press plates that are arranged on opposing sides of the cell block and that are pressed together along a stacking direction of the battery cells by way of the tie rods. The battery cells located between the press plates are pressed by virtue of the press plates being pressed together. This cell module frame has the at least one holding element of the thermally insulating holding device. The battery module is thus mounted suspended on the support apparatus by way of the cell module frame.

In one particularly advantageous development of the invention, the battery cells are stacked above one another along a height direction of the battery housing, wherein a first press plate is arranged on a top side, facing a housing ceiling, of the cell block and a second press plate is arranged on a bottom side, facing a housing base, of the cell block. In this case, the at least one holding element is arranged on the first press plate. By way of example, the press plates may be made of metal, wherein the at least one holding element is arranged on an edge, facing the support apparatus, of the first press plate. By way of example, the at least one holding element may be formed in one piece with the first press plate. To this end, U-shaped tabs may be milled out on the edge of the first press plate in order to form the holding elements. The at least one holding element may however also be attached, for example welded, to the edge of the first press plate. Such a holding element arranged on the cell module frame is able to be produced particularly easily and without great material outlay.

There may be provision for the at least one support apparatus and the at least one holding element to be made from a metal material, wherein a thermal insulation element is arranged between the at least one support apparatus and the at least one holding element. Due to the fact that the support apparatus and the holding element are made from metal, the holding device has a particularly stable design. In order to create the thermal insulation, the thermal insulation element is arranged between the holding element and the support apparatus, that is to say for example between the cross strut and the U-shaped tab. The thermal insulation element is made from a thermally insulating material and is able to reliably prevent heat from dissipating from the battery cells via the holding element to the support apparatus connected to the housing base.

In a further embodiment, the high-voltage battery has a heating apparatus for heating the battery cells. Such a heating apparatus may have for example a plurality of heating mats that may be arranged on a bottom side, facing the housing base, of the cell block, on a top side, facing the housing ceiling, of the cell block, and between the battery cells in the cell block. By way of example, there may be provision for a heating mat to be arranged respectively on the bottom side of the cell block, both battery cells in the cell block and on the top side of the cell block. By virtue of the heating apparatus, the battery cells, for example at a low ambient temperature or external temperature, are able to be heated such that they operate particularly efficiently.

A motor vehicle according to the invention comprises a high-voltage battery according to the invention. The motor vehicle is in particular designed as a passenger vehicle in the form of an electric or hybrid vehicle.

The embodiments set forth with reference to the high-voltage battery according to the invention and the advantages thereof apply accordingly to the motor vehicle according to the invention.

Further features of the invention become apparent from the claims, the figures and the description of the figures. The features and combinations of features mentioned above in the description and the features and combinations of features mentioned below in the description of the figures and/or shown on their own in the figures are able to be used not only in the respectively specified combination but also in other combinations or on their own.

BRIEF DESCRIPTION OF THE DRAWINGS

The invention is now explained in more detail on the basis of one preferred exemplary embodiment and with reference to the drawings, in which.

DETAILED DESCRIPTION OF THE DRAWINGS

In the figures, identical and functionally identical elements are provided with the same reference signs.

Figure 1:
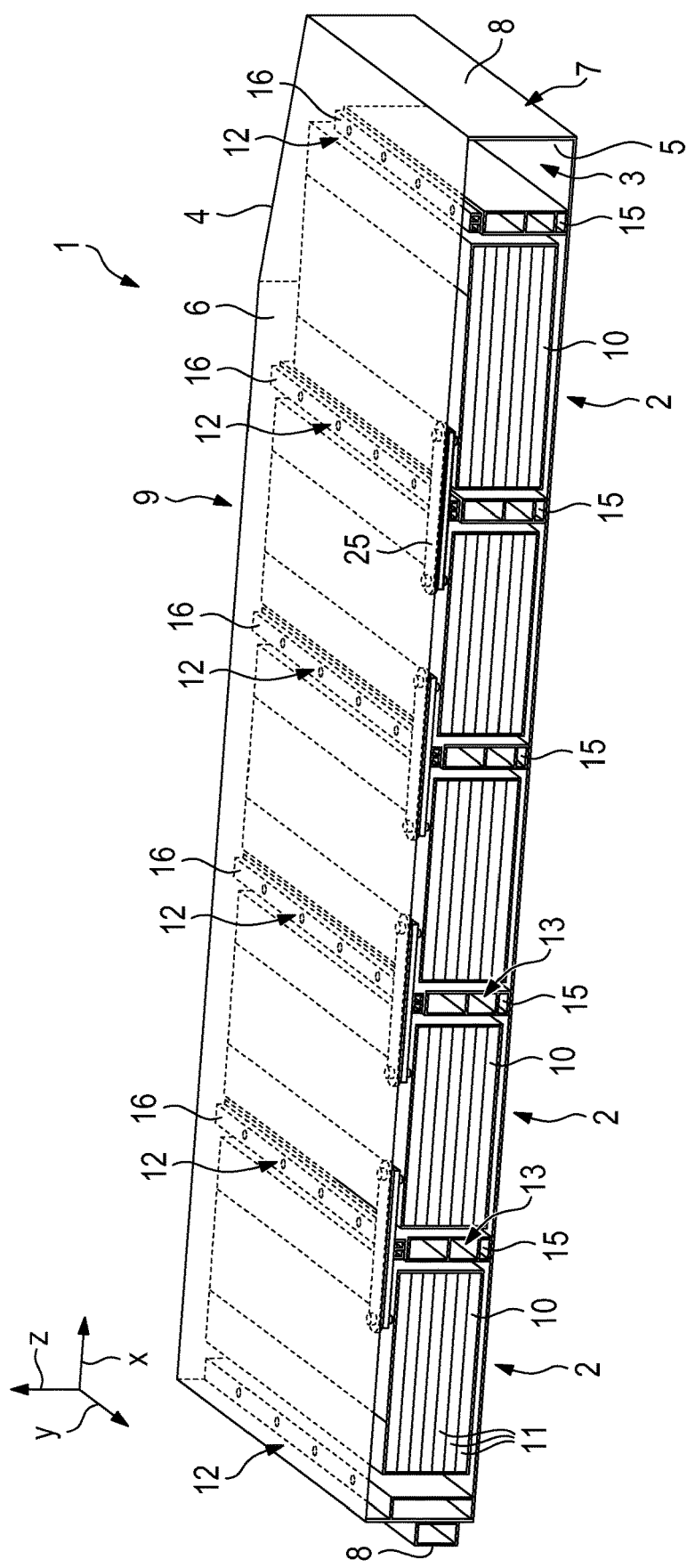
FIG. 1 shows a schematic illustration of one embodiment of a high-voltage battery according to the invention.
Figure 2:
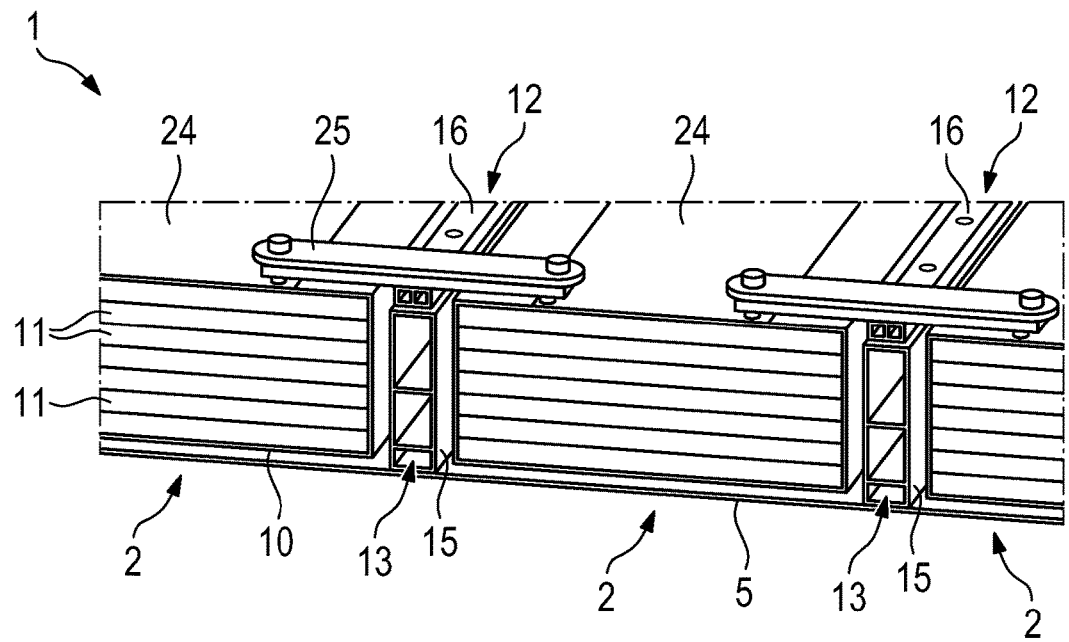
FIG. 2 shows an enlarged section of the high-voltage battery according to FIG. 1.

FIG. 1 shows a high-voltage battery 1 for a motor vehicle, not shown here. FIG. 2 shows an enlarged section of the high-voltage battery 1 according to FIG. 1. The high-voltage battery 1 is in particular designed as a traction battery for an electrically driveable motor vehicle. The high-voltage battery 1 has a plurality of battery modules 2 that are arranged next to one another in a longitudinal direction x of the high-voltage battery 1 in a reception space 3 of a battery housing 4 of the high-voltage battery 1 and are electrically connected to one another via module connectors 25. The reception space 3 of the battery housing 4 is defined and enclosed by housing walls in the form of a housing base 5, a housing ceiling 6 and a housing shell 7. The housing shell 7 has two opposing side walls 8 in the longitudinal direction x, a rear wall 9 and a front wall, not shown here.

The battery modules 2 each have a cell block 10 that has a plurality of battery cells 11 stacked above one another in a height direction z of the high-voltage battery 1. The battery cells 11 are designed as solid-state cells or ASS cells (ASS—all solid state) whose internal resistance decreases as the temperature increases. The battery cells 11 thus produce less power loss as the temperature increases, and are thus able to operate particularly efficiently, that is to say be charged and/or discharged particularly quickly, at high temperatures, in particular up to 100° C. The high-voltage battery 1 therefore does not have a cooling device for actively cooling the battery cells 11.

Instead, the high-voltage battery 1 has a thermally insulating holding device 12 that is designed to hold the battery modules 2 in the reception space 3. The thermally insulating holding device 12 is furthermore designed to minimize an output of heat from the battery cells 11 of the cell block 10 to the battery housing 4 and thus to prevent cooling of the battery cells 11 during operation of the high-voltage battery 1. The thermally insulating holding device 12 is in this case designed to mount the battery modules 2 suspended, such that they do not make contact with any of the housing walls 5, 6, 7. The holding device 12 is thus designed as a suspension for the battery modules 2. The battery modules 2 are thus not in direct contact with the battery housing 4, such that thermal coupling between the battery cells 11 and the battery housing 4 is minimal.

Figure 4:
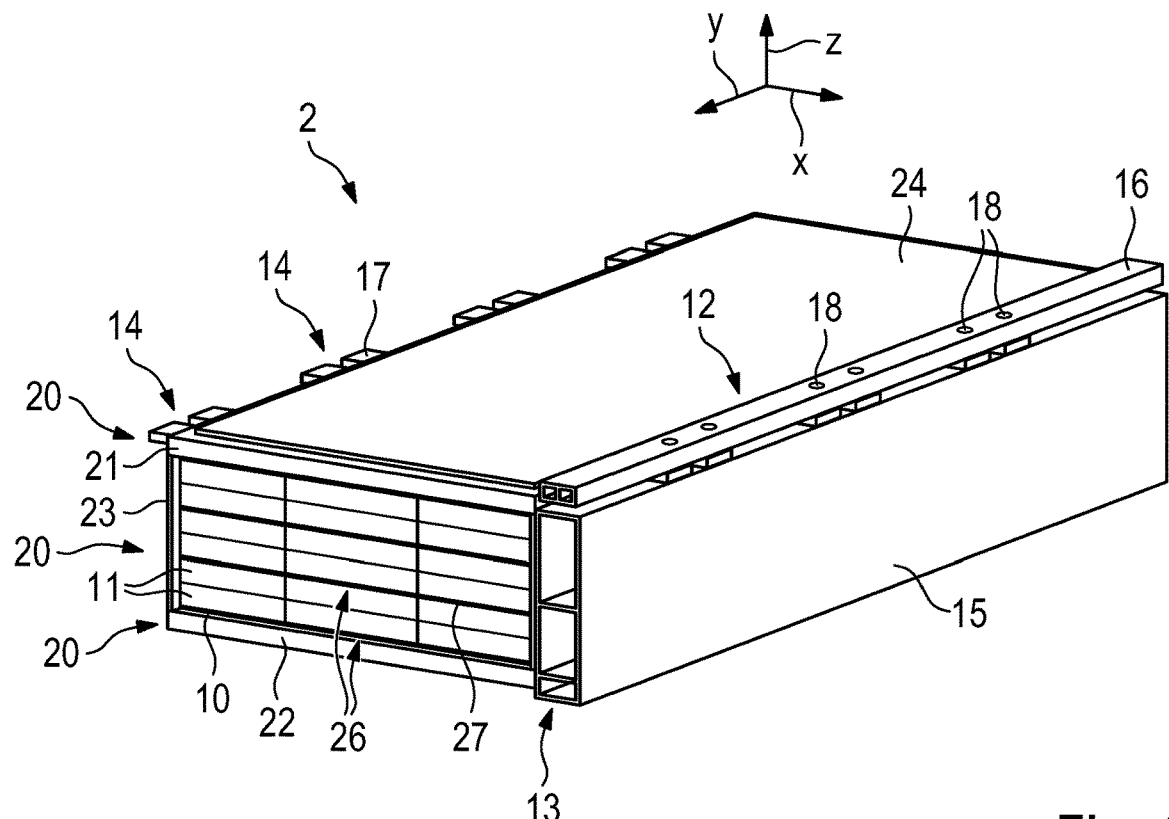
FIG. 4 shows a perspective illustration of a battery module attached to a support apparatus.
Figure 5:
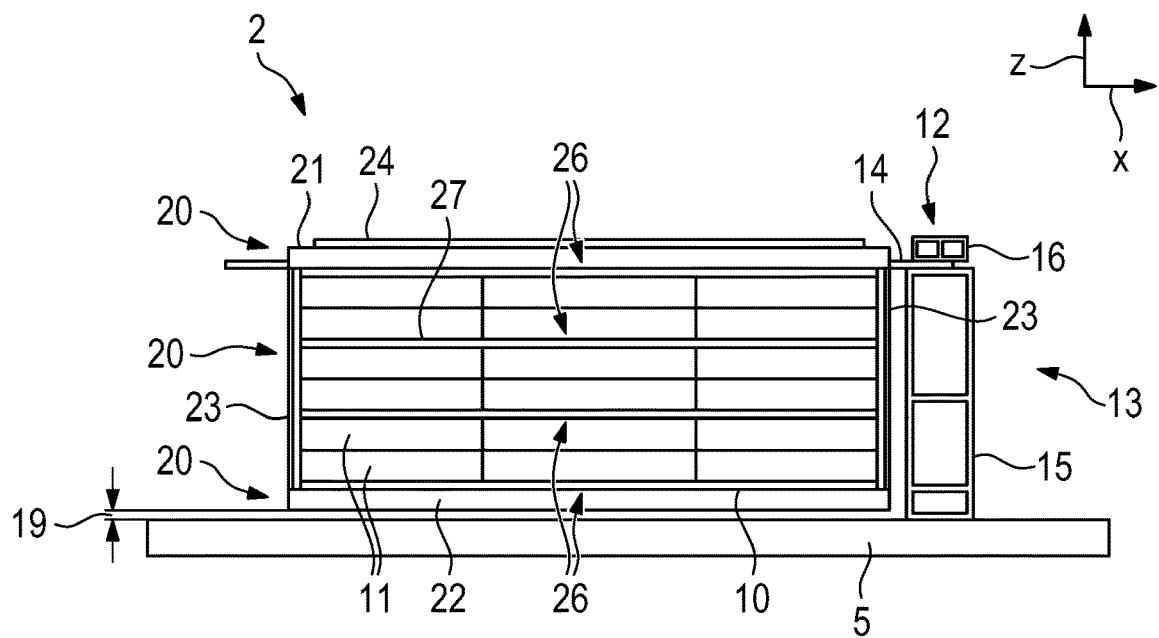
FIG. 5 shows a front view of the battery module according to FIG. 4 attached to the support apparatus.

The holding device 12 has support apparatuses 13 and holding elements 14, the latter not being visible in FIG. 1 and FIG. 2, for the suspended mounting of the battery modules 2. The holding elements 14 are shown in the illustration of the battery module 2 in FIG. 3. FIG. 4 and FIG. 5 show perspective views of a battery module 2 attached to a support apparatus 13. The support apparatus 13, as shown for example in FIG. 1, FIG. 2 and FIG. 4, is attached to the housing base 5 of the battery housing 4. In this case, two support apparatuses 13 may be assigned to each battery module 2, such that the battery modules 2 are supported on two opposing sides and suspended between two support apparatuses 13. The support apparatuses 13 in this case each have a cross strut 15 extending in a width direction y of the high-voltage battery 1 and a fastening strip 16. The cross struts 15 may however also extend in a direction of the high-voltage battery 1 different from the width direction y.

Figure 3:
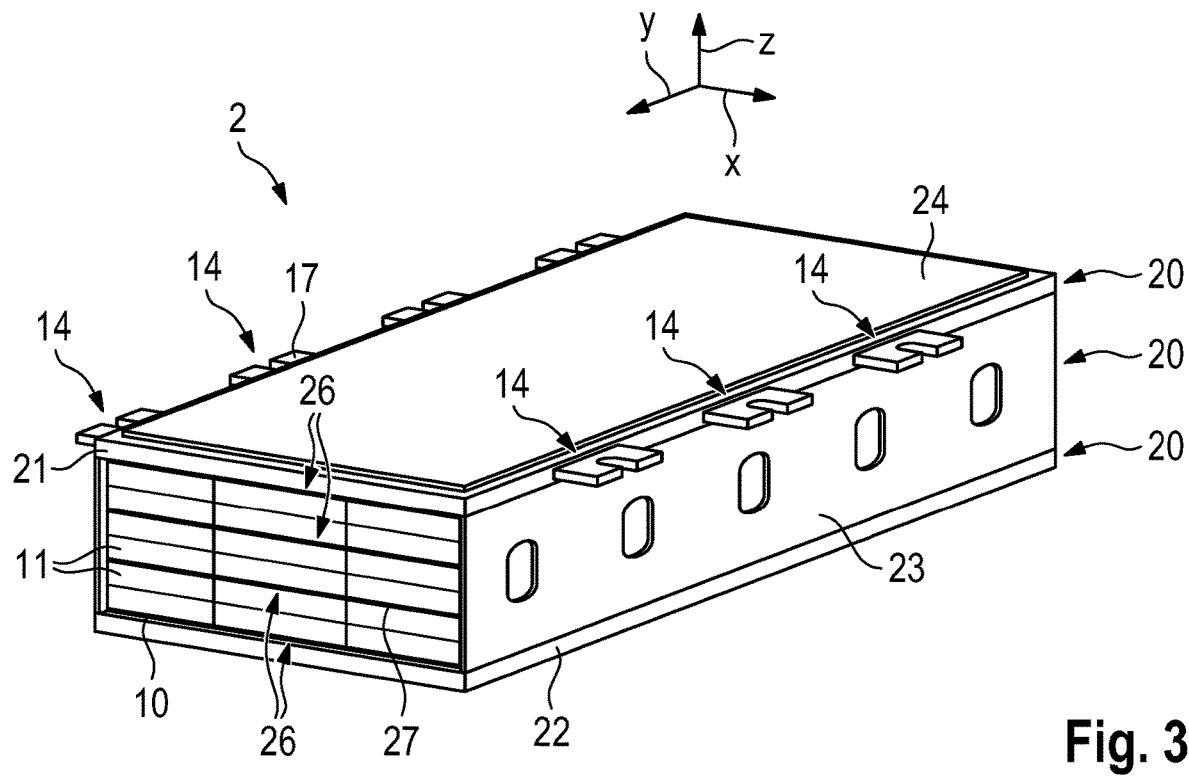
FIG. 3 shows a perspective illustration of a battery module of the high-voltage battery.

The holding element 14 may be attached between the cross strut 15 and the fastening strip 16 and may be designed, as shown in FIG. 3, as a U-shaped tab 17. The battery module 2 in this case has, on each side facing a support apparatus 13, three holding elements 14 in the form of U-shaped tabs 17. The tabs 17 are in this case placed on the cross strut 15 and clamped between the cross strut 15 and the fastening strip 16. The fastening strip 16 and the tabs 17 may be attached to the cross strut 15 by way of screws 18, for example. The holding elements 14 are thereby clamped on one side and the battery module 2, as shown in FIG. 4, is mounted at a distance from the housing base 5 or hovering above the housing base 5.

A distance 19 between a bottom side of the battery module 2 and the housing base 5 is in particular at least 5 mm, preferably at least 10 mm. This firstly makes it possible to prevent the housing base 5 from damaging the battery module 2 in the event of deformation in the direction of the battery module 2. Such deformation may result for example from the motor vehicle driving over an obstacle that is higher than a ground clearance of the motor vehicle. By virtue of the distance 19 between the battery module 2 and the housing base 5, the battery cells 11 are also able to expand unhindered along the height direction z during operation.

The cross strut 15 may be designed for example as an extruded profile and consist of a metal material. The holding element 14 may also consist of a metal material, such that the holding device 12 has a particularly stable design. In order to maximize a thermal resistance between the holding element 14 and the cross strut 15 and thus to reduce a transfer of heat from the holding element 14 to the cross strut, a thermal insulation element may be arranged between the cross strut 15 and the holding element 14.

The battery module 2 in this case has a cell module frame 20 for bracing the battery cells 11 (see in particular FIG. 3 to FIG. 5). The cell module frame 20 has a first press plate 21 that faces the housing ceiling 6 in the installed state of the battery module 2 in the reception space 3 of the battery housing 4. The cell module frame 20 also has a second press plate 22 opposite the first press plate 21 and that faces the housing base 5 in the installed state of the battery module 2. The press plates 21, 22 are pressed together by way of tie rods 23 (see FIG. 3) of the cell module frame 20 in order to brace the cell block 10 situated between the press plates 21, 22 by pressing the battery cells 11. The holding elements 14 are in this case arranged on the first press plate 21 and may for example be formed in one piece with the first press plate 21. A circuit board 24 is in this case also arranged on the first press plate 21 and may for example have monitoring electronics for monitoring the battery cells 11.

The battery module 2 also has a heating apparatus 26 that is designed to heat the battery cells 11. The heating apparatus 26 in this case has a plurality of heating mats 27 that may be arranged between two battery cells 12 and on a top side and a bottom side of the cell block 10. In this case, a heating mat 27 is arranged on both battery cells 11. By virtue of the battery cells 11 being heated, the battery cells 11, even in the case of low ambient temperatures of the motor vehicle, are able to be brought into a temperature range in which they have a minimal internal resistance and in which they are thereby able to operate particularly efficiently and with low losses. By virtue of the thermally insulating holding device 12, it is possible to prevent the heat provided by the heating apparatus 26 from flowing away to the battery housing 4.

LIST OF REFERENCE SIGNS

1 High-voltage battery
2 Battery module
3 Reception space
4 Battery housing
5 Housing base
6 Housing ceiling
7 Housing shell
8 Side walls
9 Rear wall
10 Cell block
11 Battery cell
12 Holding device
13 Support apparatus
14 Holding element
15 Cross strut
16 Fastening strip
17 U-shaped tab
18 Screw
19 Distance
20 Cell module frame
21 First press plate
22 Second press plate
23 Tie rod
24 Circuit board
25 Module connector
26 Heating apparatus
27 Heating mat
x Length direction
y Width direction
z Height direction

What is claimed is:

1. A high-voltage battery for a motor vehicle comprising:
at least one battery module including a cell block having stacked battery cells, wherein the battery cells are designed as solid-state cells whose internal resistance decreases as temperature increases;
a battery housing having a reception space for receiving the at least one battery module; and
a thermally insulating holding device for holding the at least one battery module in the reception space, wherein the thermally insulating holding device is designed to minimize an exchange of heat between the at least one battery module and the battery housing in order to prevent cooling of the battery cells;
wherein the thermally insulating holding device is designed to mount the at least one battery module in the reception space of the battery housing suspended at a distance from housing walls of the battery housing;
wherein the thermally insulating holding device has at least one support apparatus arranged in the reception space and mechanically connected to the battery housing and at least one holding element connected to the battery module;
wherein the at least one holding element is clamped on one side in the at least one support apparatus such that the cell block of the at least one battery module is mounted suspended in the reception space at a distance from the housing walls of the battery housing and at a distance from the at least one support apparatus;
wherein the at least one support apparatus has a cross strut attached to a housing wall in the form of a housing base and a fastening strip; and
wherein the at least one holding element is clamped between the cross strut and the fastening strip attached to the cross strut.

2. The high-voltage battery according to claim 1, wherein a distance between the battery module and a housing wall in the form of a housing base in the suspended state of the battery module is at least 10 mm.

3. The high-voltage battery according to claim 1, wherein the thermally insulating holding device has at least two support apparatuses for holding the at least one battery module and at least two holding elements that are arranged on two opposing sides of the battery module, and
wherein the at least one battery module is supported on both sides by the holding elements clamped on the support apparatuses on one side and is mounted suspended between the support apparatuses.

4. The high-voltage battery according to claim 1, wherein the at least one holding element is designed as a U-shaped tab that protrudes laterally from the cell block.

5. The high-voltage battery according to claim 1, wherein the at least one battery module has two press plates between which the cell block is arranged, and at least two tie rods that are routed along opposing sides of the cell block and that are connected to the press plates, forming a cell module frame that presses the battery cells against one another, wherein the at least one holding element is integrated into the cell module frame.

6. The high-voltage battery according to claim 5, wherein the battery cells are stacked above one another along a height direction of the battery housing, wherein a first press plate is arranged on a top side, facing a housing ceiling, of the cell block and a second press plate is arranged on a bottom side, facing a housing base, of the cell block, and wherein the at least one holding element is arranged on the first press plate.

7. The high-voltage battery according to claim 1, wherein the at least one support apparatus and the at least one holding element are made from a metal material, wherein a thermal insulation element is arranged between the at least one support apparatus and the at least one holding element.

8. The high-voltage battery according to claim 1, wherein the high-voltage battery has a heating apparatus for heating the battery cells.

9. A motor vehicle having a high-voltage battery including at least one battery module including a cell block having stacked battery cells, wherein the battery cells are designed as solid-state cells whose internal resistance decreases as temperature increases, a battery housing having a reception space for receiving the at least one battery module, and a thermally insulating holding device for holding the at least one battery module in the reception space, wherein the thermally insulating holding device is designed to minimize an exchange of heat between the at least one battery module and the battery housing in order to prevent cooling of the battery cells;

wherein the thermally insulating holding device has at least one support apparatus arranged in the reception space and mechanically connected to the battery housing and at least one holding element connected to the battery module;

wherein the at least one holding element is clamped on one side in the at least one support apparatus such that the cell block of the at least one battery module is mounted suspended in the reception space at a distance from the housing walls of the battery housing and at a distance from the at least one support apparatus;

wherein the at least one support apparatus has a cross strut attached to a housing wall in the form of a housing base and a fastening strip; and wherein the at least one holding element is clamped between the cross strut and the fastening strip attached to the cross strut.

* * * * *